July 13, 1965   G. W. OFFENSEND   3,194,718
LAMINATED TAPE STRUCTURE
Filed Nov. 24, 1961

GLEN W. OFFENSEND
INVENTOR.

BY R. Frank Smith
Lloyd F. Seebach
ATTORNEY & AGENT

United States Patent Office 3,194,718
Patented July 13, 1965

3,194,718
LAMINATED TAPE STRUCTURE
Glen W. Offensend, Rochester, N.Y., assignor to Eastman Kodak Company, Rochester, N.Y., a corporation of New Jersey
Filed Nov. 24, 1961, Ser. No. 154,450
6 Claims. (Cl. 161—113)

The invention relates to a laminated tape structure and particularly to a tape structure for handling and supporting strips of thin, pressure-sensitive adhesive material which are partially preformed and arranged in a predetermined frame or pattern in the material.

In the prior art, the cutting and transporting of sheets or frames of pressure-sensitive adhesive material present a problem in that such sheets or frames are exceptionally thin and, if unsupported, other means must be provided to ensure that the material does not buckle or deform in the cutting and application station. When sheets or frames of pressure-sensitive adhesive material are applied to record cards, as disclosed in U.S. Patent No. 2,588,087, the sheets or frames of such material are conveyed in close proximity to the cutting station by a carrier tape or strip which is peeled from the adhesive material just prior to entry of a sheet or frame into the cutting station. From the point at which the carrier strip is removed to the point at which the frame or sheet is positioned under the cutting knife, no support is provided for the frame or sheet and due to the fact that it is very thin, it is difficult to locate the material for accurate cutting and application with respect to the article to which the frame or sheet is to be applied.

These disadvantages of the prior art are overcome by the present invention in that the disclosed laminated tape structure provides a carrier tape which is not removed from the adhesive material and provides a definite and relatively stiff support for the frame of adhesive material during the time a frame is moved into the cutting station and until the frame is actually cut and released from the strip of adhesive material. This is accomplished by arranging the portion of the adhesive material to be applied to an article over an opening or aperture in the carrier tape.

The laminated tape structure disclosed and described in detail hereinafter comprises a tape of pressure-sensitive adhesive material which is laminated to a carrier tape. The frame of pressure-sensitive adhesive material is made up of individual strips which are partially preformed. The carrier tape is provided with rectangular apertures which are spaced longitudinally of the carrier tape. A piece of the same material as said carrier tape, which is smaller in size and similar to the apertures in the carrier tape, is secured to the adhesive material within and in registry with each aperture in the carrier tape. A rectangular frame of adhesive material is then left exposed within each aperture in the carrier tape. The exposed pressure-sensitive adhesive material is then slit in each aperture to partially form individual strips. These strips are formed by providing longitudinal slits adjacent each longitudinal edge of each aperture and adjacent each longitudinal edge of the piece of material in each aperture, the slits being as long as the edges which they are adjacent. In this form, each frame of partially formed strips can be fully supported as it is moved into a cutting station and by making transverse cuts adjacent the transverse edges of the aperture and the piece of material in the aperture which will intersect the longitudinal slits, the frame is then formed of individual strips and can be applied to the article or object.

The primary object of the invention is, therefore, to provide a laminated tape structure for carrying a prearranged pattern of partially formed strips of a pressure-sensitive adhesive material.

Another object of the invention is to provide a laminated tape structure comprising a tape of pressure-sensitive adhesive material and a carrier tape, the carrier tape being provided with longitudinally spaced openings and the portions of the adhesive tape exposed in each of the openings in the carrier tape being provided with longitudinal slits for partially forming a pattern of individual strips of the adhesive material.

Yet another object of the invention is to provide a laminated tape structure comprising a tape of pressure-sensitive adhesive material and a carrier tape in which the tape of adhesive material is provided with a pattern of longitudinal slits within each rectangular opening spaced longitudinally in the carrier tape and the carrier tape is provided with a pattern of openings adjacent one edge of the tape of adhesive material to permit entry of a cutting device for movement in a transverse direction of the laminated tape to sever the frame of adhesive material into discrete strips.

And still another object of the invention is to provide a laminated tape structure comprising a tape of pressure-sensitive adhesive material and a carrier tape in which the portions of the adhesive material exposed in the longitudinally spaced rectangular frame openings in the carrier tape are slit in the longitudinal direction adjacent the inner and outer edges of the frame openings for a length corresponding to the edges for partially forming individual strips of the adhesive material.

This and other objects and advantages of the invention will be apparent to those skilled in the art by the description which follows.

Reference is now made to the accompanying drawing wherein like reference numerals designate like parts and wherein.

Figure 1:
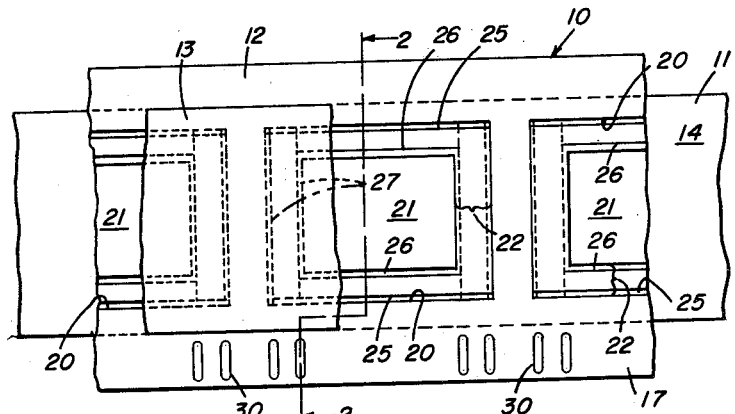
FIG. 1 is an elevation view of the laminated tape structure showing the arrangement of the elements comprising the laminae and the arrangement of the slits for partially forming the individual strips of adhesive material.

With reference to FIG. 1, the laminated tape structure 10 comprises a tape 11 of pressure-sensitive adhesive material, a carrier tape 12 and a protecting tape 13. Tape 11 can be a thin, transparent or opaque material; for example paper or a polyester film, such as Mylar, which is coated on one surface 14 thereof with a pressure-sensitive adhesive 15. Carrier tape 12 can be a paper tape, such as kraft paper, and tape 13 can be glassine paper. Tape 13 is utilized to protect the exposed adhesive surface of tape 11, as described more fully hereinafter, when tape 10 is wound in roll form. Tape 13 can be eliminated if the other surface 16 of tape 11 is coated with an adhesive resistant agent.

Tape 12 is provided with longitudinally spaced apertures 20 and has a piece or area 21 of kraft paper, which is the same in thickness, quality and texture as tape 12, positioned centrally in each of apertures 20. The size of areas 20 is such that a hollow rectangular frame 22 is formed which is of the same width on all sides. Since tape 11 is laminated to tape 12 by the adhesive 15 on surface 14, portions of the adhesive surface are exposed within apertures 20 and it is to these portions that areas 21 are secured. The adhesive surface still exposed within frame 22 is then protected by tape 13 which lies against surface 17 of tape 12. In the process of laminating tapes 11, 12 and 13 and because the thickness of the tapes is very small, tape 13 will be joined to tape 11 by the adhesive surface of tape 11 which is exposed within each of frames 22 in tape 12.

Before tape 13 is joined to tapes 11 and 12, tape 11 is provided with slits 25 adjacent the outer edges of apertures 20 and with slits 26 adjacent the corresponding outer edges of areas 21. Slits 25 are at least as long as the longitudinal dimension of apertures 20 and slits 26 are at least as long as the longitudinal dimension of areas 21, the longitudinal dimensions of the slits being measured longitudinally of tapes 11 and 12. When slits 25 and 26 are so arranged, see FIG. 1, four strips of adhesive material are partially formed by each of frames 22.

Figure 3:
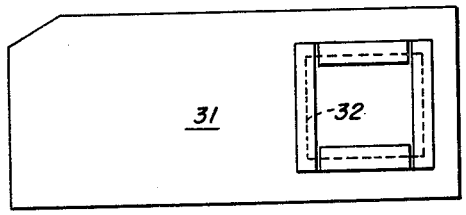
FIG. 3 is an elevation view of a card showing a frame formed by individual strips of adhesive material applied to a card and in registry with an aperture in the card.
Figure 2:
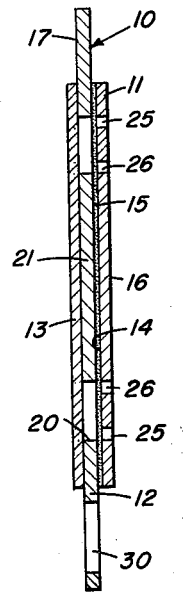
FIG. 2 is a vertical section taken on the line 2—2 of FIG. 1.

As shown in FIGS. 1 and 2, tapes 11 and 13 can be of the same width and it is preferable that tape 12 be wider than tapes 11 and 13. Between one of the edges of tapes 11 and 13 and the corresponding edge of tape 12, perforations 30 are spaced longitudinally of tape 12. These perforations serve a dual function in that they can be used to intermittently or continuously advance the tape 10 for feeding it into a cutting and/or applicating station and to provide a point of entry for the cutting knife or knives. For his latter use, the perforations are preferably elongated in a transverse direction with respect to the tape 10 and are substantially aligned in a transverse direction with the transverse edges of the apertures 20 and the areas 21. By way of example, if it is assumed that tape 10 is being moved to the right, as shown in FIG. 1, the tape 13, if used, is first peeled from surface 17 of tape 12 and from the adhesive exposed in frames 22 just prior to entry of tapes 11 and 12 into a cutting station, a suitable sprocket being used to engage perforations 30 in tape 12 to advance the tape. Tape 12 remains laminated to tape 11 and both are moved into the cutting station, tape 12 providing a support for the partially formed strips in frames 22. When tapes 11 and 12 are positioned in the cutting station, a knife or a plurality of knives can be positioned in perforations 30 and moved transversely of the tapes 11 and 12 to slit tape 11, as indicated by the dotted lines 27 in FIG. 1, to form four strips of adhesive material. If a reciprocating vacuum platen were arranged under tapes 11 and 12 and card 31, shown in FIG. 3, were arranged over tapes 11 and 12 with the aperture 32 in card 31 in registry with the frame 22 and a vacuum platen, then the frame of strips can be moved upward to secure the strips to card 31, as shown in FIG. 3. The platen can be provided with a central opening for receiving area 21 and the adhesive material secured thereto as the platen moves upward through aperture 20.

The above description for securing such a frame of adhesive strips to a card is by way of example, and it will be readily appreciated that other applications are also possible. For certain applications, apertures 20 and areas 21 can take other regular geometrical forms, such as a square, trapezoid, rhomboid, etc., and can even be extended to other figures having an even number of sides.

Figure 4:
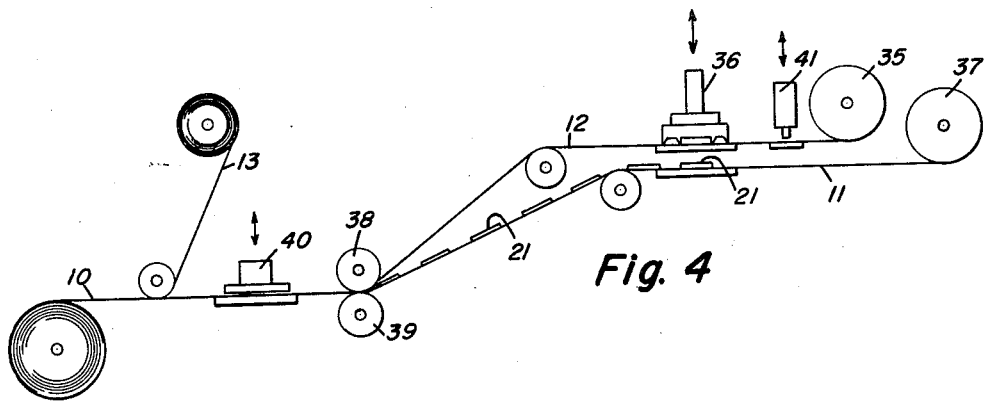
FIG. 4 is a diagrammatic representation of an arrangement for making the laminated tape structure shown in FIG. 1.

In FIG. 4 there is disclosed a diagrammatic representation of an arrangement for making the laminated tape 10. The tape 12 is withdrawn from its supply roll 35 and is moved under a compound die 36 which cuts out aperture 20 and blanks out area 21 and moves said area into engagement with the adhesive on tape 11 arranged under tape 12 and moved in synchronism therewith, tape 11 being withdrawn from supply roll 37. Tapes 11 and 12 are then laminated together, as they pass between rolls 38 and 39, with an area 21 positioned centrally in each of the apertures 20 in tape 12. The arrangement of die 36 must be such that when tapes 11 and 12 are brought together, the areas 21 and the apertures 20 are in registry. Tapes 11 and 12 are then moved beneath a die 40 which provides the slits 25 and 26 in each of the frames 22 of adhesive material. After slits 25 and 26 have been made, tape 13 is joined to tapes 11 and 12 to complete tape 10. Perforator 41 is shown in FIG. 4 as being located ahead of die 36. In this position, perforations 30 are first made and can then be used to move tape 12 with respect to die 36 and later tapes 11 and 12 with respect to die 40.

The apertures 20 can also be formed by first blanking out the areas 21 and transferring these areas to tape 11. By means of another blanking die spaced from the area die, the apertures in tape 11 can be enlarged to provide the apertures 20 which will then be of the requisite size and shape. The perforations 30 will also serve in this case as a means for moving the tape and accurately registering the apertures made by removal of areas 21 with the die for providing apertures 20.

Since various modifications and changes in the tape materials, tape structure and method of making the laminated tape structure described hereinabove will be suggested to those skilled in the art, the invention is not to be limited to the disclosed embodiment but is of a scope as defined by the appended claims.

Having now particularly described my invention, what I desire to secure by Letters Patent of the United States and what I claim is:

1. A laminated tape structure for supporting a plurality of strips partially preformed in one of the tape lamina comprising a first tape having apertures spaced longitudinally thereof, a second tape having a pressure-sensitive adhesive on one surface thereof contiguous to one surface of said first tape, and pieces of the same material as said first tape which are smaller than and similar to said apertures, said pieces being secured to the adhesive surface of said second tape and arranged centrally within each of said apertures in said first tape and said second tape being provided with longitudinal slits within each of said apertures adjacent the longitudinal edges of said apertures and of said pieces to provide partially preformed strips of said second tape.

2. A laminated tape structure in accordance with claim 1 wherein said apertures and said pieces of material are rectangular.

3. A laminated tape structure in accordance with claim 1 wherein said longitudinal slits adjacent the edges of said apertures are at least as long as said apertures and said longitudinal slits adjacent said pieces are at least as long as said pieces.

4. A laminated tape structure in accordance with claim 1 wherein said first tape is wider than said second tape and is provided between adjacent edges of said tapes with perforations aligned with each transverse edge of said apertures and of said pieces of material.

5. A laminated tape structure in accordance with claim 4 wherein said perforations are elongated in the transverse direction of said first tape.

6. A laminated tape structure in accordance with claim 1 and including a third tape having an adhesive resistant agent on at least one surface thereof which is contiguous to the other surface of said first tape and to the adhesive material exposed in said apertures in said first tape.

References Cited by the Examiner

UNITED STATES PATENTS 2,552,664   5/51   Burdine _____ 154—53.5

EARL M. BERGERT, *Primary Examiner.*